Inventors
Vern M. McNamara
Ian F. Wright

By Stevens, Davis, Miller & Mosher
Attorneys

Inventors
Vern M. McNamara
Ian F. Wright

By Stevens, Davis, Miller & Mosher
Attorneys

Sept. 15, 1970  V. M. McNAMARA ET AL  3,528,919
ELECTRONIC CERAMIC COMPOSITIONS
Filed March 28, 1966  4 Sheets-Sheet 4

Inventors
Vern M. McNamara
Ian F. Wright

By Stevens, Davis, Miller & Mosher
Attorneys

3,528,919
ELECTRONIC CERAMIC COMPOSITIONS
Vern M. McNamara and Ian F. Wright, Ottawa, Ontario, Canada, assignors to Canadian Patents and Development Limited, Ottawa, Ontario, Canada, a Canadian corporation
Filed Mar. 28, 1966, Ser. No. 538,006
Claims priority, application Canada, Apr. 1, 1965, 927,069
Int. Cl. C04b 35/26, 35/46
U.S. Cl. 252—62.63                                15 Claims

ABSTRACT OF THE DISCLOSURE

In preparing mixed metal oxides in a particular ratio the process which comprises continuously atomizing a selected blended acidic aqueous solution of said metals onto the surface of a relatively large volume of a dilute ammoniacal solution, thereby simultaneously coprecipitating precursors of said mixed metal oxides from said acidic solution the amount of said metals in said solution being balanced to provide such selected ratio in the mixed metal oxides thereby forming an intimate substantially homogeneous mixture of the precursors of such mixed metal oxide in the same selected ratio as in said mixed metal oxide and thereafter converting said precursor mixture of said precursor mixture of said mixed metal oxide. Examples of mixed metal oxides are lead zirconate-titanate, and ferrites of lead, barium, and strontium.

---

Figure 1:
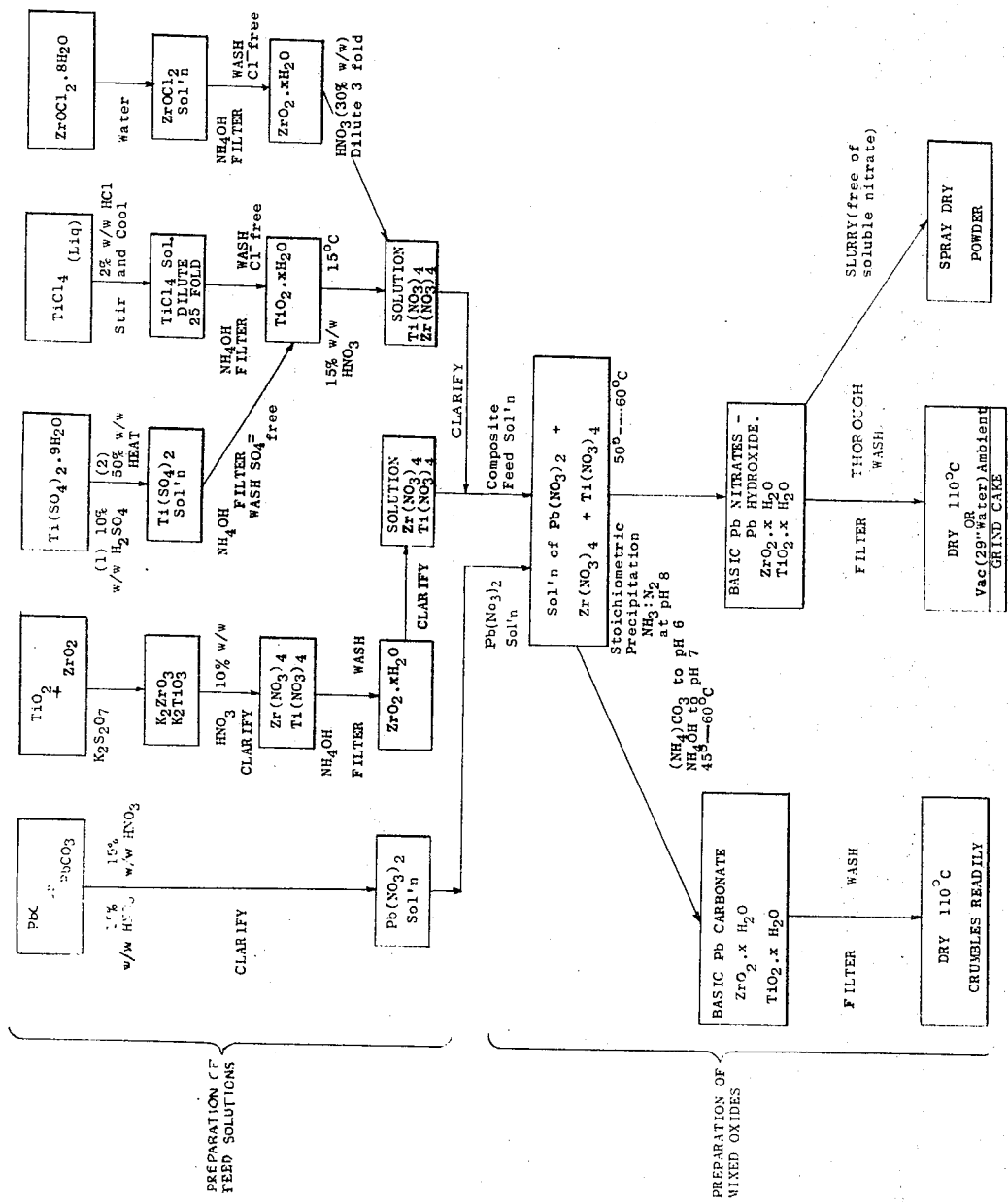

This invention relates to the preparation of mixed metal oxides.

Ceramics having piezoelectric properties are finding an increasing use in the electronics industry. Such ceramics, which are usually produced from mixed oxides of lead, zirconium and titanium, must meet rigid specifications as to purity and composition, since the properties of the final ceramic product depend on the component oxides being in stoichiometric proportions to give solid solutions $PbZrO_3$—$PbTiO_3$ free of impurities, small deviations seriously affecting the piezoelectric characteristics of the final product.

Thus, stoichiometric mixtures of the oxides of lead, zirconium and titanium will yield, upon sintering, a solid-solution series, $PbZrO_3$—$PbTiO_3$. Within this series there exists a range of compoitions that, when fabricated and fired (at 1150 to 1250° C.) as ceramic bodies, will exhibit the piezoelectric properties required in transducer applications. The ceramic feed material must be better than 99.95 percent pure, homogeneous, and of uniformly small particle size (the order of 0.5 to $1\mu$). Any compromise in these requirements interferes with the sintered ceramic density and with such electrical properties as the dielectric constant, planar coupling coefficient and hysteresis loop characteristics. The most promising composition range appears to be from 55/45 to 50/50 molar ratio $PbZrO_3/PbTiO_3$. The impurity which is considered to be the most difficult to eliminate from these products is silica.

The normal commercial practice is to produce the oxide mixtures for this purpose by grinding the individual oxides of lead, zirconium and titanium, mixing the oxides, and then preparing the final product by sintering of mixed oxides. The inherent difficulties involved in attaining uniform grinds and in obtaining a homogeneous mixture of the oxides results in a product which is not as reproducible as is desirable, and at the same time impurities are introduced which have an adverse effect on the piezoelectric properties.

Among the difficulties in such prior art processes are the following:

(1) The difficulty in obtaining complete homogeneity throughout any particular batch of physically mixed powders.

(2) The difficulty in obtaining reproducible material characteristics, batch to batch.

(3) The lack of opportunity to upgrade the purity of the final ceramic material during preparation of the oxide mixture.

(4) The amount of grinding required usually leads to contamination of the product by undesirable impurities due to excessive handling (e.g., $SiO_2$).

(5) After mixing the components, the blended materials, especially where specific gravities are as different as are PbO and $TiO_2$, are subject to segregation.

(6) The reactions leading to crystal growth in mixed and comminuted oxides begin at a relatively high temperature (800° C.). The same reactions begin at about 650° C. with precipitated material. The former are therefore more susceptible to loss of a volatile component (Pb) before complete formation of the solid solution (e.g., $PbZrO_3$—$PbTiO_3$).

A prime object of the present invention is the provision of a process for the production of a reproducible, homogeneous, high purity, chemically-bound mixed oxide product applicable to the manufacture of electronic ceramic components.

By one broad aspect of the present invention, there is now provided in a process for the preparation of mixed metal oxides, the improvement comprising simultaneously precipitating said mixed metal oxides from a stoichiometrically blended acidic solution of said metals. Such simultaneous precipitation is preferably carried out by continuously atomizing a stoichiometrically blended acidic aqueous solution of said metals onto the surface of a relatively large volume of a dilute ammoniacal solution.

In another aspect of this invention the temperature during said simultaneous precipitation step is maintained within the range of 50–60° C.

In still other aspects of the present invention, the pH is maintained at about 8 and preferably by the continuous sparging into said volume of solution of an ammonia-gas mixture; and the precipitation is carried out under conditions of agitation of the bulk solution, either by means of mechanical stirring, or by means of gaseous sparging.

By another broad aspect of the present invention, there is provided a process for the preparation of a mixed metal oxide which comprises the steps of:

(1) Preparing an aqueous acidic solution of metals in stoichiometrically balanced proportions, (2) Simultaneously precipitating said metals from said solution, (3) Washing said precipitates, (4) Thickening said slurry of washed precipitates, (5) Drying said slurry to produce a dry homogeneous powder of said mixed metal precipitates, and (6) Calcining said powder to form said oxides, said calcining being at a temperature sufficient to achieve the desired degree of reaction and solid solution.

In preferred aspects of the above broad aspect of this invention:

(a) Step (1) comprises: blending nitrates of lead, zirconium and titanium to the desired stoichiometry, said nitrate solutions also containing predetermined amounts of modifiers selected from the group consisting of Sr, Fe, Co, Cr, Ta, Nb or other beneficial additive.

(b) Step (2) comprises: continuously atomizing said stoichiometrically blended acidic aqueous solution of said metals onto the surface of a relatively large volume of a dilute ammoniacal solution to form hydroxides, basic carbonates and/or hydrated oxides.

(c) Step (3) comprises: washing said precipitate batchwise with demineralized water made slightly ammoniacal.

(d) Step (3) comprises: washing said precipitate continuously countercurrently with demineralized water made slightly ammoniacal.

(e) Step (4) comprises: thickening said precipitated slurry by means of settling and decantation.

(f) Step (4) comprises: thickening said precipitated slurry by means of partial filtrations and repulping.

(g) Step (4) comprises: thickening said slurry by means of centrifugations.

(h) Step (5) comprises: producing a dry homogeneous powder of metal carbonates and/or oxides which are non-segregating by spray drying said thickened precipitated slurry; and (i) Step (5) comprises: producing a dry homogeneous powder of metal carbonates and/or oxides which are non-segregating by filtration of the precipitate slurry and drying under vacuum.

In addition, by another aspect of this invention, there is provided the additional step of (7) comminuting the calcined material to a particle size required for subsequent fabrication to a ceramic component. Comminution may preferably be achieved by pneumatic milling, i.e. by the so-called "jet mill." Such equipment yields a product having a particle size $<0.5\mu$ when the feed material has a size of about $3\mu$ to about $10\mu$.

By another aspect of the present invention there is provided in a process for the preparation of mixed metal oxides, the improvement which comprises:

(a) Reacting a stoichiometrically blended acidic aqueous solution of said metals with ammonium carbonate until the pH of said solution is about 6, and (b) Then reacting said solution with ammonium hydroxide until the pH of said solution is about 7, reactions (a) and (b) being carried out at a temperature of 45–60° C.

In another preferred aspect of this invention, the stoichiometrically blended acidic aqueous solution is $Pb(NO_3)_2$, $Zr(NO_3)_4$ and $Ti(NO_3)_4$, wherein the product initially recovered is basic Pb carbonate together with $ZrO_2 \cdot xH_2O$ and $TiO_2 \cdot xH_2O$.

In another preferred aspect of this invention a procedure is provided wherein the product initially recovered is a mixture of basic lead carbonate and strontium carbonate, together with $ZrO_2 \cdot xH_2O$ and $TiO_2 \cdot xH_2O$.

By still another aspect of this invention there is provided an apparatus comprising:

(a) A silica-free reaction vessel.

(b) Means for controlling the temperature within said vessel.

(c) Primary feed inlet means disposed at the top of said vessel and comprising liquid feed outlet means and inert gaseous outlet means disposed around said liquid feed outlet means, to provide a fine droplet spray of said liquid feed.

(d) Gas sparging means disposed near the bottom of said vessel for providing an inert gas diluted spray of gaseous reactant, and (e) Stirring means.

In a preferred embodiment of this aspect of the present invention, means, such as a siphon outlet, are provided to maintain a predetermined liquid level in the vessel by withdrawing slurry from adjacent the bottom of the vessel. Preferably, the slurry is stored in a "hold" or "surge" tank.

In summary, therefore, the present invention is based on the fact that chemical precipitation would allow closer control of the relative proportions of the components and of the homogeneity of the final product as well as being less subject to deleterious contaminants. By the present invention applicants have invented a process of taking the three components into solution, eliminating unwanted impurities preferably by filtering, then simultaneously precipitating the metal hydroxides in an homogeneous mixture suitable for sintering into the final product.

In one of its more specific embodiments, the present invention is based on precipitation from a nitrate solution of the metals. Solutions of the individual metals are first prepared by dissolution of the oxides or salts in the appropriate acid solutions, clarifying, and then precipitating with ammonia. The precipitates are washed until free of all traces of soluble salts, then are redissolved in nitric acid and reclarified, giving some further elimination of contaminants. Solutions of known metal nitrate content are prepared by this means which, after precise analysis, are carefully blended to give a stock solution with the components in the exact ratios desired.

A preferred process of precipitation of the homogeneously mixed oxides is instantaneous neutralization of the composite metal nitrate stock solution. This is preferably achieved by spraying the composite solution onto the surface of an agitated solution containing excess ammonia at an elevated temperature. The alkalinity is preferably maintained at pH 8 by the continuous sparging in of an ammonia-nitrogen gas mixture.

The precipitated product is preferably spray dried to provide a mixed oxide product that requires only a minimum of grinding for example, in a pneumatic mill to reach the required particle size (0.5 to 1 micron) for ceramic fabrication. This process produces partial calcination of the oxides, and at the same time prevents any possible precipitate segregation.

In carrying out such precipitation procedure, it is necessary to control the contents of the precipitation vessel, which initially is a very dilute alkaline ammonium nitrate solution. The contents of the precipitation vessel are under control within specified limits as to (a) temperature; preferably by an external heating jacket (b) pH; preferably by control of ammonia gas flow rate through a disperser located at the bottom of the tank, immediately below the impeller (c) agitation of the bulk solution (slurry) and dispersion of the precipitant; preferably by mechanical stirrer and nitrogen gas sparging (d) retention time; preferably by control of feed rate, syphon rate of slurry withdrawal, and vessel size (e) slurry density; preferably by control of solution concentrations.

For the purpose of further description of the present invention, certain details will be given below with respect to the preparation of homogeneously blended powders, namely those from a portion of the lead zirconate-lead titanate solid solution series which are required as source material in the fabrication of electronic ceramic wafers. The specific chemical composition within this series that will yield a source material capable of imparting optimum electrical properties to the fabricated ceramic is believed to be within the range of from 70/30 molar ratio $PbZrO_3/PbTiO_3$ to 50/50 molar ratio, $PbZrO_3/PbTiO_3$.

It has been found that there is a reversible equilibrium between lead hydroxide and basic lead nitrates within the slurried precipitate. Such an equilibrium might be written as

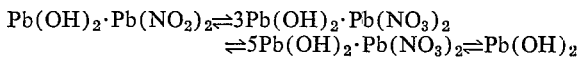

The zirconium and titanium form complex hydrated oxides, as $(Zr, Ti)O_2 \cdot xH_2O$ and do not become involved with the nitrate ion.

The variables which affect the above equilibrium are:

(a) The nitrate concentration in the bulk solution. The higher this concentration, the farther the equilibrium moves to the left.

(b) The pH of the slurry. The higher the pH of the bulk liquid, the more favorable are conditions for the displacement of nitrate from the precipitate. A pH environment greater than 7 encourages a higher hydroxide to nitrate ratio in the precipitate, and consequently, in the present invention, a pH limit of about 8 is used for the neutralization process.

(c) The extent of contact time of the precipitate with the barren ammonium nitrate solution. When filtration and washing of the precipitate followed immediately upon completion of the precipitation, the lead hydroxide to basic lead nitrate ratio is considerably increased. It is therefore important to remove the precipitate from contact with the ammonium nitrate in the barren solution as quickly as possible. Alternatively, the nitrate-rich supernatant solution may be diluted and then decanted directly following the precipitation of the Pb, Zr and Ti as mixed hydroxides.

(d) The temperature at which precipitation is carried out. It is preferred to carry out the present invention at a temperature of approximately 60° C.

Figure 2:
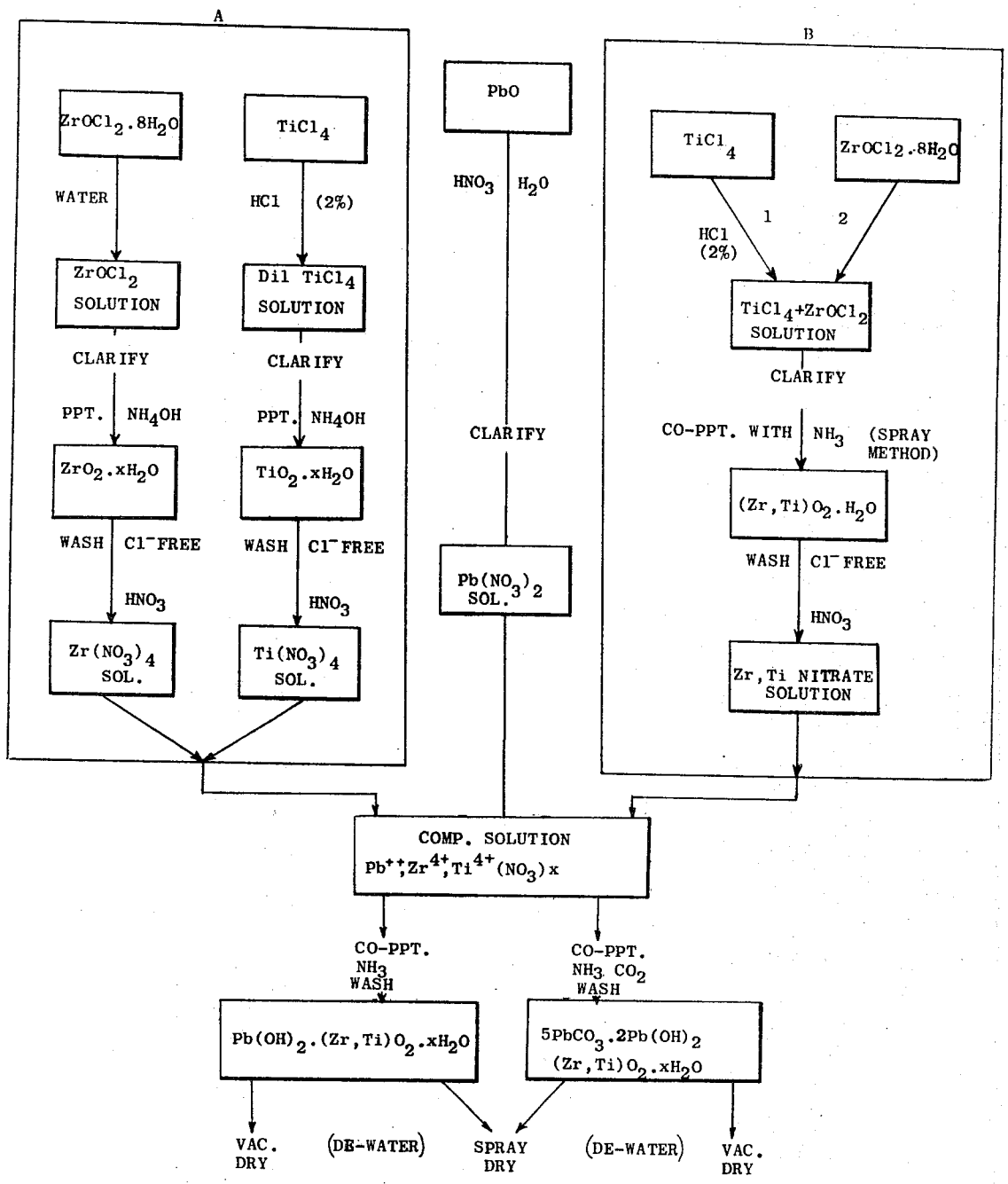
Figure 3:
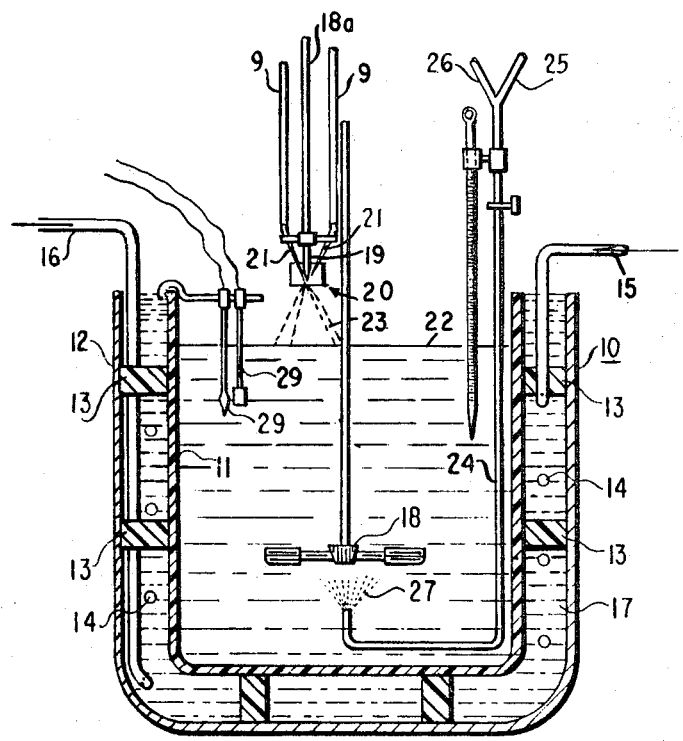
Figure 5:
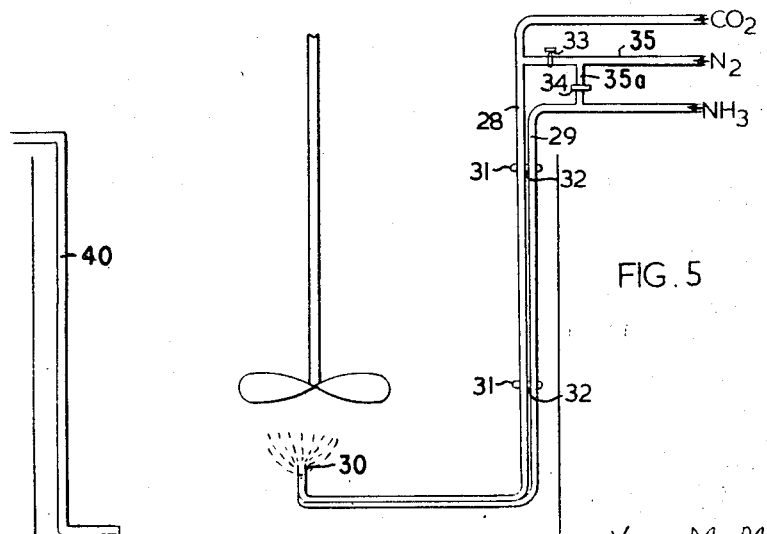
Figure 4:
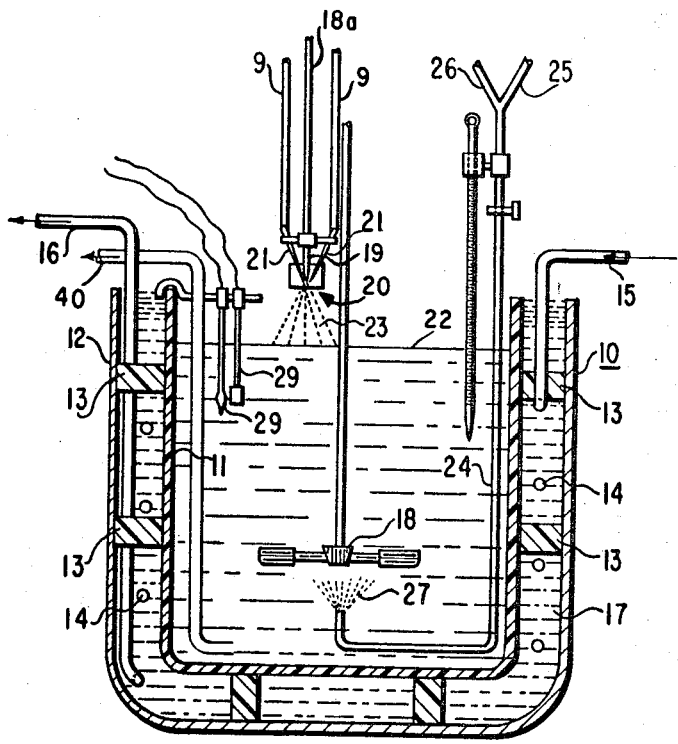

In the accompanying drawings,

FIG. 1 is a general schematic drawing of the procedure for preparing the feed solutions and the subsequent process according to one embodiment of the present invention, FIG. 2 is a general schematic drawing of another procedure within the present invention for preparing the feed solutions used and a subsequent process according to another embodiment of the present invention, FIG. 3 is a central vertical cross-section of an apparatus according to one embodiment of the present invention, FIG. 4 is a central vertical cross-section of an apparatus according to another embodiment of the present invention, and FIG. 5 is an idealized partial, central vertical cross-section of an apparatus according to a still further embodiment of the present invention.

EXAMPLES

Source chemicals

The chemical preparations initially involved the use of relatively pure metal oxides of $Pb^{2+}$, $Zr^{4+}$ and $Ti^{4+}$. They were reagent grade PbO, $ZrO_2$ and $TiO_2$. Subsequently, salts of the metals were used. The salts are specified below in Table 1.

The procedures used to bring the same chemicals into solution, blend them into a high purity composite nitrate feed solution, precipitate the metals and finally filter, wash dry and mortar the precipitate to a powder as shown in FIG. 1. It is shown that PbO, $PbCO_3$, $TiCl_4$ and $$ZrOCl_2 \cdot 8H_2O$$

are readily taken into solution. The $TiO_2$ and $ZrO_2$ require a combined fusion with $K_2S_2O_7$ to become acid soluble. The $Ti(SO_4)_2 \cdot 9H_2O$ only dissolves, very slowly, in hot concentrated $H_2SO_4$ (50 percent w/w). However, the titanium sulphate nonahydrate, when crushed fine and heated at 150° C. for 2–3 hr., becomes readily soluble in dilute (10 percent) sulphuric acid.

Preparation of the feed solution

Referring to FIG. 1 in detail, it is seen that in order to prepare the $Pb(NO_3)_2$ solution, having a concentration of >200 g./l. Pb, either PbO or $PbCO_3$ may be used. When PbO is used, 5 g. of 15% w/w $HNO_3$ is used per gram of Pb, while when $PbCO_3$ is used, 3 g. of 15% w/w $HNO_3$ per gram of Pb is used. The originally prepared nitrate solution is clarified.

In order to prepare the solution of $Zr(NO_3)_4$ and $Ti(NO_3)_4$ containing about 20 g./l. Zr and 10 g./l. Ti, $TiO_2$ and $ZrO_2$ are fused in an amount of 8 g. per gram of combined oxides of $K_2S_2O_7$ in platinum. The resultant $K_2ZrO_3$ and $K_2TiO_3$ is dissolved in 50 g. of 10% w/w $HNO_3$ per g. (Ti, Zr)$O_2$ and clarified to form $Zr(NO_3)_4$ and $Ti(NO_3)_4$. The nitrate solution is precipitated as the hydroxides by treatment with $NH_4OH$ in an amount of 12 ml./g. (Ti, Zr)$O_2$ and the precipitate is filtered and washed. It is then redissolved by treatment with $HNO_3$ in an amount of 20 g. of 20% w/w per g. (Ti, Zr)$O_2$ and the nitrate solution clarified.

Alternatively, the $Ti(NO_3)_4$ and $Zr(NO_3)_4$ solution may be made from $Ti(SO_4)_2$ or from $TiCl_4$ and

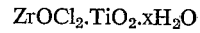

may be prepared in two alternate manners. In one way, $Ti(SO_4)_2$ solution is first prepared from $Ti(SO_4)_2 \cdot 9H_2O$. This may be done either by crushing the $Ti(SO_4)_2 \cdot 9H_2O$ and drying at 150° C. for 2–3 hours, followed by dissolving in 3 g. of 10% w/w $H_2SO_4$ per g. of salt; or by heating the salt in 50% w/w $H_2SO_4$ in an amount of 3.3 g./g. of salt. The $Ti(SO_4)_2$ solution is then treated with $NH_4OH$ i.e. 5.2 ml./g. $Ti(SO_4)_2 \cdot 9H_2O$ and the precipitate filtered and washed free of $SO_4^=$.

In the other way, $TiCl_4$ (liquid) is slowly added to 2% w/w HCl, i.e. 5 ml. 2% HCl/ml. $TiCl_4$, and stirred and cooled to form $TiCl_4$ solution diluted 25 fold. The $TiCl_4$ is then treated with $NH_4OH$, i.e. 2.8 ml./ml. $TiCl_4$ and the precipitate is filtered and washed free of $Cl^-$.

$TiO_2 \cdot xH_2O$ prepared is then formed into the nitrate by treating with 15% w/w $HNO_3$ at 15° C., i.e. 42 g./g. $TiO_2$ and diluted to about 1.5 g./l. Ti.

The $Zr(NO_3)_4$ solution is prepared by first dissolving $ZrOCl_2 \cdot 8H_2O$ in water in an amount of 3.4 g./g. salt. The solution is then treated with $NH_4OH$ i.e. 0.6 ml./g. salt, and the precipitate is filtered and washed free of $Cl^-$. The $ZrO_2 \cdot xH_2O$ is formed into the nitrate solution by treatment with $HNO_3$ i.e. 30% w/w in an amount of 6.5 g./g. $ZrO_2$ and is diluted 3 fold to form a nitrate solu-

TABLE 1.—SEMI-QUANTITATIVE SPECTOGRAPHIC ANALYSES [1]

Impurities in Starting Materials for Hydroxide Precipitation Process

| Chemical | Source | Elements percent | | | | | | | | | | | |
|---|---|---|---|---|---|---|---|---|---|---|---|---|---|
| | | Si | Mg | Ca | Al | Fe | Bi | Cu | Nb | Ni | Mn | Na | Ag |
| PbO | Fisher certified reagent | Tr | Tr | ND | ND | 0.02 | 0.02 | 0.002 | ND | | | | 0.0008 |
| $ZrO_2$ | Fisher laboratory chem. purified | 0.4 | 0.03 | 0.4 | 0.1 | Tr | ND | ND | ND | | | | ND |
| $TiO_2$ | Baker's analyzed CP reagent | 0.3 | 0.03 | ND | 0.3 | Tr | ND | ND | 0.08 | | | | ND |
| $PbCO_3$ | Fisher certified reagent | Tr | 0.02 | 0.02 | Tr | 0.01 | 0.03 | Tr | | ND | Tr | Tr | |
| $ZrOCl_2 \cdot 8H_2O$ | National Lead Co. TAM (bulk) high purity grade | 0.05 | 0.007 | ND | 0.005 | 0.02 | ND | Tr | | 0.009 | ND | ND | |
| $Ti(SO_4)_2 \cdot 9H_2O$ | Fisher laboratory chem. purified | 0.05 | 0.02 | 0.02 | 0.004 | 0.02 | ND | Tr | | 0.007 | Tr | ND | |
| $TiCl_4$ (liq.) | do | | | | | | | Not analyzed | | | | | |

[1] By spectrographic laboratory.

NOTE.—Tr=Trace; ND=Not detected.

tion containing about 40 g./l. Zr. The $Zr(NO_3)_4$ solution is mixed with the $Ti(NO_3)_4$ solution.

A composite feed solution of $Pb(NO_3)_2$, $Ti(NO_3)_4$ and $Zr(NO_3)_4$ is prepared. The titanium solution is preferably stored as the Pb–Zr–Ti composite nitrate solution to prevent hydrolysis of the titanium. If the $Ti(NO_3)_4$ solution required for stoichiometric adjustment is to be stored at ambient temperatures, it should be $<\frac{1}{2}$ g./l. Ti. The composite solution has the following approximate solution content.

Pb 10–25 g./l.
Zr 2–6 g./l.
Ti 1–2½ g./l.
$NO_3$ 40–50 g./l.
pH≈0.2–0.6.

As hereinbefore mentioned, because of the instability of titanium in solution, a very dilute titanium nitrate solution, i.e. 1.5 g./l. of Ti or 0.5 g./l. Ti for lengthy storage, was stored in the past. It has now been found that titanium stock solutions in considerably higher concentrations may be stored for extended periods of time, if the following procedures are used for their preparation:

(1) The $TiO_2 \cdot xH_2O$, prepared as previously described is treated with the required quantity of dilute $HNO_3$, i.e. 15% w/w, at 15° C. and is then further diluted in the cold to a concentration of about 10 g./l. Ti. This solution is clarified if necessary, and then immediately stored at a temperature of about 0° C. in a refrigerated cabinet until required for composite feed solution adjustment. In this manner, composite solutions have resulted that exhibit improved concentrations and adjustments to mixed solutions with reference to Ti have been made more readily.

(2) Major portions of the titanium required for a production lot of mixed oxides may be prepared in the following manner and may be stored at ambient temperatures as a composite solution containing the bulk of the zirconium.

In this procedure, $TiCl_4$ is added slowly with stirring and adequate ventilation to a 2% w/w HCl solution maintained at about 25° C. This combination results in a solution containing 35 g./l. Ti. The $ZrOCl_2 \cdot 8H_2O$ salt is then dissolved in the solution of $TiCl_4$ so prepared, i.e. in the approximately 320 g./l. dilute $TiCl_4$ solution. Sufficient further dilution is required only to allow an efficient filtration rate for clarification of the solution.

The Zr and Ti are coprecipitated by the atomization technique of the present invention as will be further described hereinafter using $NH_3/N_2$ gas injection to control the pH. Precipitation at ambient temperature and pH 8 is satisfactory. All equipment should be plastic or rubber covered to prevent corrosive attack by $Cl^-$.

Dilution of the slurry with demineralized water is required to maintain adequate fluidity for good mixing. The precipitate is decantation washed until free of chloride ions.

The precipitate is dissolved at ambient temperature with dilute $HNO_3$ (1:3) i.e. 16 g./g. Zr plus 40 g./g. Ti.

This solution containing Zr and Ti in the nitrate medium may be stored at room temperature indefinitely. By the specific procedure described a solution containing 4.7 g./l. Ti and 9.5 g./l. Zr was formed, which remained stable over several months. By preferred aspects of this invention, the major portion of the requirement with regard to Zr and Ti should be prepared as described above. Then only minimal quantities of pure Ti solution need be stored in the refrigerated cabinet for solution adjustment.

The stoichiometric precipitation according to the present invention is now carried out. This may be effected to prepare basic Pb carbonate, $ZrO_2 \cdot xH_2O$ and $TiO_2 \cdot xH_2O$ by first treating with $(NH_4)_2CO_3$ to a pH of about 6, and then with $NH_4OH$ to a pH of 7 at a temperature of 45–60° C. This precipitate is then filtered, washed and dried at 110° C. to form a readily crumbly material.

An alternative procedure to effect the coprecipitation of basic lead carbonate together with zirconium and titanium hydroxides is the following. The precipitation may be effected by reaction with $CO_2$ and $NH_3$, each diluted with $N_2$. The ratio of $CO_2:N_2$ and $NH_2:N_2$ should be about 1:1.

The rate of $NH_3$ is dependent upon the maintenance of the desired pH, i.e. $TiO_2$ in the reaction vessel. The rate of $CO_2$ addition is based upon calculations of the amount of basic lead carbonate to be formed (and of strontium carbonate, whenever such component is involved). A minimum "excess over theoretical" quantity $CO_2$ is determined by experiment, this excess being required completely to precipitate the lead (and strontium) as the carbonate. For precipitation of basic lead carbonate, $CO_2$ is required in an amount of 1.25 times theoretical. Furthermore, for complete precipitation of $SrCO_3$, the $CO_2$ is required in an amount of $>3$ times but $<5$ times the theoretical requirement for the total of Pb plus Sr carbonates.

Alternatively, the precipitation may be by reaction with a 1:1 gaseous mixture of $NH_3$ and $N_2$ at a pH of 8 and a temperature of 50–60° C., to consume 0.55 g. $NH_3$ gas per g. pure, dry mixed oxides of Pb, Zr and Ti to form basic Pb nitrates plus Pb hydroxide, and $ZrO_2 \cdot xH_2O$ and $TiO_2 \cdot xH_2O$. The slurry which is washed free of soluble nitrate may then be spray dried to form the powder.

Alternatively, the precipitate may be filtered and thoroughly washed. The precipitate is then dried at 110° C. or under a vacuum of 29″ water at ambient temperature. The dried cake is then ground.

As shown in FIG. 1, and in summary, therefore, the oxides, or salts, or Zr and Ti are taken into appropriate solution, clarified, and precipitated as the hydroxide by the addition of aqueous ammonia to pH 7. The precipitates are washed free of all traces of soluble salts by successive decantations and dilutions with ammonia water (pH 8). Separan (0.05 percent w/w aqueous solution) is titrated into each slurry in an amount sufficient to give rapid settling for decantation. A precipitation slurry should contain less than 10 percent soluble salts if settling is to be efficient. For wash slurries some salt (about 0.3 g./l. $NH_4NO_3$) is desirable in the ammonia water, along with Separan, to ensure satisfactory settling. Thorough washing of all hydroxide precipitates is preferred to free them from the soluble contaminants (e.g. $SO_4^=$, $Cl^-$, $K^+$). Testing of wash solution for $SO_4$ and Cl ions should be carried out to indicate when washing of the precipitates is complete. The precipitates are then redissolved in $HNO_3$, diluted, clarified and combined with filtered $Pb(NO_3)_2$ solution, which is obtained from the dissolution of PbO or $PbCO_3$ in nitric acid solution.

The above described treatment permits the removal of a certain amount of impurity (particularly silica) from the nitrate solutions by filtration. It is also possible that traces of silica and other undesirable elements may be discarded in the barren sulphate and chloride solutions. The procedures employed to obtain nitrate solutions of Pb, Zr and Ti are not, however, intended as purification steps. The purpose is to obtain metal nitrate solutions, free of $SO_4^=$ and $Cl^-$, for compositing as precipitation feed solution.

It is not essential to maintain specific metal concentrations in solution. Minimum quantities of nitric acid are used to dissolve the PbO or $PbCO_3$, as well as the zirconium and titanium hydroxide precipitates. The volumes of stock solutions of the lead and zirconium nitrates are relatively small for facility in handling and storing. This causes no problems at any concentrations below saturation. When titanyl nitrate solution is prepared, the concentration of the Ti is preferably adjusted to less than 1.5 g./l. and further, major portions ($\approx$80 percent) of the stoichiometric requirement of lead and zirconium nitrate solutions preferably are added. These precautions are desirable in order to prevent hydrolysis of the titanium in dilute nitric acid solutions (pH≈0.1 to 0.5). A quantity of titanyl nitrate solution is usually stored to allow for final Ti adjustment of the analysed composite feed solution. This titanium solution is preferably adjusted to less than 0.5 g./l. Ti to extend the interval of usefulness prior to titanium hydrolysis.

The final composite feed solution preparation requires precise blending of the metal nitrate solutions. Therefore accurate analyses of all solutions is an essential prerequisite prior to the carrying out of the present invention. The composite solution is diluted to the maximum volume that can be accommodated in the batch reaction vessel in which the mixed hydroxides are to be precipitated, this being preferably effected by spraying into the vessel. Such dilution limits the occlusion of impurities that might tend to co-precipitate with the hydroxides and would also enhance opportunities for displacing soluble nitrate and combined nitrate from the precipitate, as will be discussed later.

A typical composite precipitation feed solution, based on 500 g. of mixed dry oxides of Pb, Zr and Ti, was 14 litres analyzing 22.7 g./l. Pb, 5.42 g./l. Zr, 2.42 g./l. Ti and 50.5 g./l. total $NO_3$. This particular solution can be caluculated as 54.1 moles percent $PbZrO_3$ and 45.9 moles percent $PbTiO_3$.

FIG. 2 is an alternative general flow sheet according to the present invention. The procedures to prepare the individual solutions of $Zr(NO_3)_4$ and $Ti(NO_3)_4$ as well as for preparing the solution of $Pb(NO_3)_2$ have already been described. Accordingly only the preparation of the composite Zr, Ti nitrate solution will be described.

The $TiCl_4$ is dissolved in 2% HCl and to this is added $ZrOCl_2.8H_2O$ to form a solution of $TiCl_4$ and $ZrOCl_2$. This solution is clarified and is then coprecipitated with $NH_3$ using the spray method which will be described hereinafter. The precipitate is washed free of chloride ions and then is dissolved in nitric acid to form a solution of Zr, Ti nitrates.

The composite solution of $Pb^{++}$, $Zr^{+4}$, $Ti^{+4}$, $(NO_3)_x$ may be coprecipitated according to the spray process of the present invention either with $NH_3$ or with $NH_3+CO_2$. In the former case the product is $$Pb(OH)_2.(Zr, Ti)O_2xH_2O$$

while in the latter case the produce is $$5PcCO_3.2Pb(OH)_2(Zr, Ti)O_2.xH_2O$$

In either case, the precipitate is water washed and is then dewatered, either by vacuum drying or by spray drying.

Table 2 shows the preparation of composite solutions of improved concentrations.

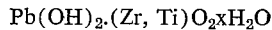

TABLE 2.—PREPARATION OF A COMPOSITE SOLUTION OF METAL NITRATES

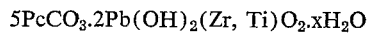

|  | Max. conc. obtained in stock soln. (g./l.) | Process stock solns. | | Blended soln. of comp. $Pb(Zr_{.52}Ti_{.48})O_3$ | |
|---|---|---|---|---|---|
|  |  | (g./l.) | $NO_3$(g./l.) | (g./l.) | $NO_3$(g./l.) |
| PbO | 300 | 170 | 65 | 38.4 | |
| $ZrO_2$ | 50 | 30 | 50 | 11.3 | |
| $TiO_2$ | 27 | 17 | 100 | 6.8 | |
| Total |  |  |  | 56.5 | 73 |

Precipitation procedures

Three procedures have been developed for the production of finely divided homogeneously mixed compositions of Pb, Zr and Ti which would be suitable for fabrication and firing as ceramic material. It is believed advantageous completely to precipitate the metals from solution, thus discarding "barren" solution containing no appreciable metal value. One procedure developed is the rapid neutralization of the composite nitrate feed solution with ammonia. The metals are precipitated as gelatinous mixed hydroxides and are known to be intimately blended in the slurry.

The other procedures are each two-step procedures. Firstly, the composite nitrate solution pH is adjusted to a value just below the point at which a precipitate first appears. In the first of these procedures, basic lead carbonate is precipitated by the addition of ammonium carbonate, followed by rapid neutralization with ammonia to pH 7 to complete the precipitation of Zr and Ti as hydroxides. In the second of these two procedures basic lead carbonate (and/or basic strontium carbonate) is precipitated by the injection of nitrogen diluted $CO_2$ and $NH_3$ to the solution. The rate of $NH_3$ injection is such as to maintain the pH at 7.0. The rate of $CO_2$ addition is based upon calculations of the amount of basic lead carbonate to be formed (and of strontium carbonate, whenever this component is involved). A minimum "excess over theoretical" quantity of $CO_2$ is determined by experiment, this excess being required to completely precipitate the lead (and strontium) as the carbonate. For precipitation of basic lead carbonate, $CO_2$ is required in an amount of 1.25 times theoretical. Furthermore, for complete precipitation of $SrCO_3$, the $CO_2$ is required in an amount of >3 but<5 times the theoretical requirement for the total of Pb plus Sr carbonates. This two step procedure provides a carbonate-containing precipitate which filters and washes readily. Secondly, such precipitate dries to an excellent, crumbly texture.

Precipitation variables

There are a number of variables involved in the production of homogeneous mixed precipitates. The variables are:

(1) Concentrations of components in the precipitation feed solution. The hydroxide precipitation procedure involves complete precipitation of the metals. Free nitric acid is preferably maintained at the near minimum value necessary for a clear solution. The pH is usually very close to zero. The feed solution may be adjusted, prior to co-precipitation of the metals, to a pH of 1.6 without causing permanent precipitation. Two steps would thus be required. Firstly, the pH of a batch of feed solution is slowly raised to 0.6 by the controlled addition of 1:1 $NH_4OH$ solution. Then the neutralization is continued to a pH value just below incipient precipitation (1.6) by the slow addition of $(NH_4)_2CO_3$ solution (15% w./w.). Such solution having a pH of 1.6 represents the least acid precipitation feed solution possible, and is particularly advantageous in the co-precipitation process by which precipitation is achieved by sparging $NH_3/N_2$ and $CO_2/N_2$ gas mixtures. The volume of $NH_3$ gas injected is, greatly reduced.

(2) Concentration of the precipitant. Hydroxide precipitation is preferably accomplished by using ammonia gas since it is easy to control the flow and there is a minimum loss of $NH_3$. The dilution of the ammonia by $N_2$ gas is known to give better filtering characteristics to the precipitate, that is, filtration is more rapid since the precipitate is less gelatinous. The gas dilution range that has been most effective and is thus preferred in this type of precipitation is from 2:1 $NH_3/N_2$ to 1:2 $NH_3/N_2$. The same conditions are preferred when the additional precipitant $CO_2$ gas is employed. Such additional gas, diluted, may be distributed to the reaction mixture by a separate, but closely parallel, sparging tube provided with a terminal disperser frit.

(3) Precipitation pH. This value should be greater than 7 but less than 8.2 for precipitation by ammonia. If carbonates are present then the maximum pH value should be 7 so as to minimize resolubilizing Zr and Ti in carbonate solution.

(4) Temperature. It is believed that a temperature between 50° C. and 60° C. is most favourable for ammonia precipitation procedures in which excessive ammonia atmosphere is not desirable.

(5) Rates of addition of reactants. To ensure homogeneity in the mixed hydroxide precipitate it is preferred to combine ammonia and feed solution in such a manner that neutralization of the feed solution (pH 8) would occur substantially instantaneously. Flow rates are therefore adjusted to allow precise control over the reaction.

(6) Total reaction time. This involves contact time in the precipitation vessel and digestion time in contact with barren solution or other media.

(7) The method of contacting feed solution and percipitant in precipitation vessel is preferably by spraying the feed solution and by adding amomnia as gas; for coprecipitation as mixed oxides and hydroxides, and by adding both ammonia and carbon dioxide as gases for coprecipitation as mixed carbonates, hydroxides and oxides.

(8) Molar ratios of major components, $PbO.ZrO_2$ and $PbO.TiO_2$. Of particular interest is the range 50/50 $PbO.ZrO_2/PbO.TiO_2$ (molar ratio) to 70/30 molar ratio.

(9) Doping of the major constituents with minor constituents to enhance or modify the piezoelectric properties. Minor constituents would be of the order of 6 percent to less than 1 percent and could include Fe, Cr, Sr, Ta, Ce, Ni, Co, Nb, or other metals of benefit. Coprecipitation techniques may be desired.

(10) Precipitate washing techniques.
 (a) Filtration—wash filter cake.
 (b) Decantation washing—filter.
 (c) Decantation washing—spray dry.

(11) Precipitate drying.
 (a) Filter cake dried at 110° C.
 (b) Filter cake dried at ambient temp. under vacuum (30″ water).
 (c) Filter cake dried at 30–50° C. under vacuum (30″ water).
 (d) Spray drying of precipitate slurry.

The preferred embodiment for precipitation of the mixed hydroxyides of Pb, Zr and Ti involved spraying of the nitrate feed solution onto the surface of a thoroughly agitated bulk solution which was maintained at pH 8 by the injection of amomnia gas. The temperature of the bulk solution was held at some desired value, usually 55–60° C., by the use of external steam coils.

FIG. 3 shows a preferred embodiment of the apparatus employed for tests which involved the production of 400–500 grams (dry basis) of precipitate. A vessel 10, comprising inner tank 11 formed of polyethylene (or any other inert material which would not add silica impurity to the system) and a stainless steel outer tank 12 spaced therefrom by spacers 13 is provided with coils 14 connected to a steam inlet line 15 and a steam outlet line 16 for the purpose of heating a heat exchange liquid (i.e. water) 17 in the space between inner tank 11 and outer tank 12. Disposed along the central vertical axis of the tank is an impeller 18 driven by a motor (not shown).

The apparatus is provided with a feed inlet line 18a terminating in a spray nozzle 19 which is one nozzle of a spay head 20. Spray head 20 also includes a pair of nozzles 21 each connected to a source of air under pressure (i.e. of 2 p.s.i.g.) via lines 9. The feed solution is also preferably fed under a pressure of 2.5 p.s.i.g. The spray head 20 is vertically adjustable in relation to the level of liquid 22 in the inner tank 11 so that it is preferably 3, or 4″ thereabove. In this manner the spray pattern 23 striking the surface is a circular one, about 3″ in diameter.

An alternative spray head which may be used instead of spray head 20 is an industrial hydraulic spray nozzle, made of 316 stainless steel. It consists of multiple orifice adjustment and the feed solution is pumped under pressure of 30 to 100 p.s.i.f. to the nozzle. The spray pattern is also as described. An hydraulic nozzle causes less "misting" of the solution than does a pneumatic nozzle.

The apparatus is also provided with a gas sparging tube 24, whose outlet is preferably positioned along the central vertical axis of the tank, immediately below the impeller 18. Ammonia reactant gas under pressure is fed through line 25 to sparging line 24, and spraging nitrogen gas under pressure is fed to line 24 through line 26. Thus, the gas spray pattern 27 below impeller 18 is a mixture of $N_2$ and $NH_3$.

The apparatus is also provided with a thermometer 28 for temperature measurement, and electrodes 29 connected to a pH meter (not shown) for pH measurement.

A preferred modification of the apparatus of FIG. 3 is shown in FIG. 4. Thus, there is also provided a siphon tube 40 so disposed as to maintain the liquid level in the vessel by drawing slurry from adjacent the bottom of vessel 11. The slurry my be directed to a "hold" or "surge" tank (not shown). The siphon may also be used to empty the reaction vessel 11 at the end of the run.

Another modification of the apparatus of the invention is shown (in idealized form) in FIIG. 5 where only the different features over FIG. 3 are shown. Two tubes 28 and 29, each provided with ad ispersion frit 30 at the exit end thereof are fastened together at 32. Spacers 32 are employed to maintain the two dispersers in side-by-side but spaced apart relation. Diluent nitrogen is admitted to tube 28 via nitrogen line 35 and stop-cock 33, and to tube 29 via tube 35a and stop-cock 34. The two dispersers 28 and 29 do not touch, so that there is no interference one to the other. Both sparging tubes terminate, under the impeller, in porous ceramic distributer frits 30 which cause a very fine dispersion of gas bubbles.

In use, and referring to the apparatus shown in FIG. 3 the spray head 20 which consisted of 3 drawn glass tips was employed so that the center one 19 provided a metered flow of feed with the two outer nozzles 21 providing compressed air jets which atomized the feed strem and directed the spray onto the surface of the bulk solution. The spray head unit 20 was adjustable so that it could be positioned 3 or 4″ above the solution. The spray pattern striking the surface is circular, about 3″ in diameter. In this manner very fine droplets of acid feed solution (pH≈0.5, or at an adjusted pH of 1.6 if desired) were instantly neutralized on striking the surface of the agitated bulk liquid (pH 8). Each precipitated particle therefore consists of the desired proportions of the three metal hydroxides. Localized pH variations at the surface of the bulk liquid are negilgible. The nitrate solution feed rate is 60 ml./min., requiring approximately 1000 cc. $NH_3$ gas per minute to stabilize the bulk solution at pH 8. Nitrogen gas is blended into the ammonia gas stream in a 1:1 volume ratio for the following reasons:

(a) Improved mixing of the bulk solution and the precipitate.

(b) Improved $NH_3$ gas distribution throughout the bulk liquid.

(c) Improved precipitate filtering characteristics by causing the hydroxide precipitate to be less gelatinous.

At start-up of a precipitation run 10 litres of ammonia water (pH 8) are added to the polyethylene tank (capacity of 24 litres) to cover the impeller sufficiently to prevent splashing, and the electrodes are then lowered into the water. About 60 g. ammonium nitrate are then added to stabilize operation of the pH electrodes. The temperature is raised to 55–60° C. (water jacket) and the pH raised to 8 by a slight ammonia addition. The feed solution supply tank (polyethylene) is under 2½ p.s.i.g. air pressure, which allows the flowmeter setting to hold steady throughout the 6 hr. run. The gas mixture of $N_2+NH_3$ is injected through a sparging tube directly under the impeller. Adjustments, when necessary, in the setting of the ammonia gas flowmeter reading enable good pH control.

It is usually desirable that the precipitate be recovered in such a way that it does not remain in contact too long with a nitrate rich (50 g./l.) barren solution.

Drying of hydroxide precipitates

Most oven-dried hydroxide precipitates are hard and brittle. Vigorous grinding is required which creates the problem of contamination by silica. Precipitates were slowly dried in partial vacuum. According to another embodiment of the present invention precipitate-held moisture is displaced with methanol (followed by ether) prior to drying. Acetone is an excellent alternative to the methanol-ether combination. This result is a fine crumbling dry powder in which the displacement of the water is complete. The particular precipitate produced in this work contains an exceedingly large quantity of water even when thoroughly pressed out on a Buchner filter. Excess methanol is required to displace this moisture thoroughly.

There are many parameters in connection with the above described procedure.

(a) Spraying of the feed solution.—To ensure substantially instant neutralization and thus mixed precipitation of the three hydroxides, the spray procedure of feed solution delivery is preferred. The minute droplets of the acidic solution appear not to cause undesired local pH fluctuations in the bulk slurry which could cause momentary partial redissolution of particles of precipitate.

(b) Agitation.—Thorough mechanical stirring is preferred in order to maintain a uniformly controlled bulk pH. Fresh slurry from the liquid surface should be quickly pulled into the bulk liquid, and the ammonia gas rapidly distributed throughout. Nitrogen gas diluent complements impeller action in the dispersal of the ammonia. The gas mixture should be injected at a point underneath the impeller so that gas bubbles are dispersed outward.

(c) Temperature.—An elevated temperature encourages rapid reaction rates and aids in densification of the precipitated particles. Subsequent filtration and washing procedures are benefitted. A temperature of 50–60° C. in the reaction vessel is preferred. A temperature in excess of 60° C. has been found to cause excessive ammonia loss from the bulk solution surface. The temperature may be controlled by a steam-heated water jacket surrounding the polyethylene vessel.

(d) pH.—Close control of the bulk solution at pH 8 is believed to be optimum. A barren filtrate is preferably achieved. Conditions distinctly on the basic side of neutral might favour a decrease in the formation of basic lead nitrate. A pH greater than 8 is unjustified in hot solutions because of considerably increased ammonia consumption.

(e) Material of Construction.—In this process, materials such as plastic must be used to prevent contamination of the product by silica. The vessel and impeller in the present example are of polyethylene. The thermometer and pH electrodes are standard laboratory equipment. The gas sparging tube should also be polyethylene. On the larger scale equipment, the impeller is of 316 stainless steel. For handling chloride solutions for the preparation of the stock solution a rubber lined stainless steel shaft and impeller is used, along with glass or hard rubber spray nozzle.

Electric motors and support metal should be shielded. Moisture and ammonia vapour should not be allowed to accumulate on metal equipment and drip into the slurry.

Table 3 below is a summary of the test conditions for the eleven tests which produced mixed hydroxide precipitates suitable for subsequent thermal studies.

TABLE 3.—TEST CONDITIONS

Precipitation of the mixed Hydroxides of Pb, Zr and Ti from Nitrate Solution with Ammonia

| Run No. | Source material | Feed solution, pH | Precipitant | Temp. (° C.) | Run time (hr.) | Feed solution | Precipitant addition | Reaction vessel | pH control | Ppt. washing [1] method (till Ppt. is free of soluble nitrate) |
|---|---|---|---|---|---|---|---|---|---|---|
| 37 | $ZrO_2$, $TiO_2$, PbO | 0.35 | Conc. $NH_4OH$. | [2] | 2 | Dropwise | Dropwise | Contained 50 ml. water at pH 8, impeller: pH electrodes. | 8 | Ammonia water, pH 9. |
| 38 | Same as above | 0.20 | $NH_3+N_2$(2:1). | 60 | 6.5 | do | Fine stream of gas. | Contained 1 litre hot water at pH 8, gas injected at bottom: impeller: electrodes. | 8 | pH 9. |
| 39 | do | 0.25 | $NH_3+N_2$ (1:1). | 45 | 4.5 | do | do | Contained 1.5 litre hot water at pH 8. Equipped as above. | 8 | pH 10. |
| 40 | do | 0 | $(NH_4)_2CO_3$, Conc. $NH_4OH$. | 45 | [3] | Bulk | Added as rapidly as possible. | $(NH_4)_2CO_3$ to pH 1.6—adjust—no ppt. $(NH_4)_2CO_3$ to pH 6.0—rapid. $NH_4OH$ to pH 7.0—rapid. | 7.0 | pH 9. |
| 45 | do | 0.20 | $NH_3+N_2$(1:1). | 45 | 5 | Atomized with air. | Fine stream of gas (under impeller). | Contained 2 litres hot water at pH 8, feed atomized onto surface of thoroughly agitated bulk liquid. Equipped as Test 38. | 7.5 | Ammonia water, pH 9 0.5 litre ethyl alcohol 0.25 litre ether. |
| 46 | do | 0 | $NH_3+N_2$(1:1). | 45 | 6.5 | do | do | Started with 1.8 litre ammonia water. Otherwise as in Test 45. | 7.5 | Ammonia water, pH 9 0.4 litre ethyl alcohol 0.4 litre ether. |
| 47 | do | 1.0 | $NH_3+N_2$(1.1). | 45 | 7 | do | do | Started with 1.2 litre ammonia water otherwise as in Test 45. | 7.5 | Do. |
| 55 | $ZrOCl_2$. $8H_2O$, $Ti(SO_4)_2$. $9H_2O$, $PbCO_3$. | | $NH_3+N_2$(1:2). | 60 | 7 | do | do | See Fig. 1. Initial volume ammonia water=8 litres. | 7.0 | Ammonia water, pH 7. |
| 57 | Same as 55 except Ti from liquid Ti (Cl)$_4$. | | $NH_3+N_2$(1:2). | 55 | 6 | do | do | As Test 55; initail volumes 10 litres. | 7.5 | Ammonia water, pH 7.5. |
| 60 | Same as 55 | | $NH_3+N_2$(1:2). | 55 | 6 | do | do | do | 8.0 | Ammonia water pH 8. |
| 62 | do | | $NH_3+N_2$(1:1). | 55 | 6 | do | do | do | 8.0 | Decantation water, +0.5% w./w. $NH_4OH$. |

[1] Ppt. filtered and washed directly following precipitation—Tests 37, 39 and 40. All other tests—ppt. remained in contact with $NH_4NO_3$ solution for >15 hr.
[2] Ambient.
[3] Rapid.

As seen in Table 3, for tests 37–40 and 45–47 the metal oxides were used as source material. These tests were each based on 100 g. or less of dry precipitate. A considerable amount of time was required to fuse the combined $ZrO_2$ and $TiO_2$ with $K_2S_2O_7$ using platinum crucibles with covers. This procedure was the only way in which these oxides could be converted to a nitric acid soluble form. Subsequently, for tests 55, 57, 60 and 62, more readily soluble metals salts were employed as source chemicals. The salts used were zirconium oxychloride and titanium sulphate (tests 55, 60 and 62) or titanium tetrachloride (test 57).

In test 37 concentrated $NH_4OH$ and also the nitrate feed solution were added, dropwise, from burettes into a beaker of water at room temperature. In tests 38 and 39 the nitrate feed solution was added dropwise into hot water, the pH of which was controlled at 8 by ammonia-nitrogen gas mixture. In test 40 ammonium carbonate salt was added to the bulk feed solution until the pH increased to 6, thus precipitating the Zr, Ti and some Pb. The precipitation was completed by ammonia addition to pH 7. If carbonate addition was carried beyond pH 6 in an attempt to complete the lead precipitation, then the concentration of carbonate required was excessive and resulted in solubilization of zirconium and titanium at pH 7.

These tests indicated that the hydroxide precipitation procedure should be revised to provide for atomization of the nitrate feed solution onto surface of a thoroughly agitated bulk solution. In each batch test this bulk solution is initially ammonia water (pH 8). Test 45–47 and 55, 57, 60 and 62 involved the spray technique for feeding the Pb–Zr–Ti composite nitrate solution into the precipitation vessel. Reaction temperature for tests ranged from 45 to 60° C., the higher temperature producing the best precipitate characteristics while maintaining a reasonably limited ammonia loss from the hot bulk solution.

Table 4 indicates the quantities of solution involved in the precipitation method and the extent of metal losses in the discarded solutions.

TABLE 4.—RESULTS

Precipitation of the Mixed Hydroxides of Pb, Zr and Ti from Nitrate Solution with Ammonia

| Run No. | Solution Volumes (l.) | | | Losses in Waste Solutions (g./l.)[1] | | | | | | Drying of Precipitate | | | Dry Mixed Powder (−100 m. Tyler) | |
|---|---|---|---|---|---|---|---|---|---|---|---|---|---|---|
| | Feed | Barren | Water-wash | Barren | | | Water-wash | | | Temp., °C. | Conditions | Observations Dry Cake | Total | To M. S. D.[1] |
| | | | | Pb | $ZrO_2$ | Ti | Pb | $ZrO_2$ | Ti | | | | | |
| 37 | 1.03 | 1.18 | 2.0 | <0.001 | <0.02 | <0.002 | | | | 110 | Atmosphere | Hard, brittle | 20 | 17 |
| 38 | 2.46 | 2.46 | 1.5 | 0.010 | <0.01 | <0.001 | 0.010 | <0.01 | <0.001 | 110 | do | do | 103 | 87 |
| 39 | 1.5 | 3.0 | 3.0 | 0.001 | <0.01 | <0.002 | <0.001 | <0.01 | <0.002 | 110 | do | do | 62 | 43 |
| 40 | 0.6 | 1.2 | 0.8 | <0.001 | 0.11 | <0.002 | <0.001 | 0.00 | <0.002 | 110 | do | Soft, crumbles | 66 | 42 |
| 45 | 1.4 | 3.1 | 2.0 | 0.003 | <0.02 | <0.002 | 0.034 | <0.02 | <0.002 | (3) | Vacuum | do | 78 | 35 / 31 |
| 45a | | | | | | | | | | 235 | do | Slightly yellow | | 31 |
| b | | | | | | | | | | 150 | Vacuum | } Powder from | | 7 |
| c | | | | | | | | | | 100 | do | } test 45. | | 7 |
| d | | | | | | | | | | 50 | Vacuum | | | 7 |
| 46 | 2.2 | 2.3 | 3.5 | 0.006 | <0.02 | <0.002 | 0.006 | <0.02 | <0.002 | (3) | do | Soft, crumbles | 106 | 91 |
| 46a | | | | | | | | | | 150 | Vacuum | } Powder from | | 7 |
| b | | | | | | | | | | 100 | do | } test 46. | | 7 |
| c | | | | | | | | | | 50 | Vacuum | | | 7 |
| 47 | 2.8 | 3.7 | 2.5 | <0.001 | <0.02 | <0.002 | <0.002 | <0.02 | <0.002 | (3) | do | Soft, crumbles | 108 | 93 |
| 55 | 12 | 20 | 14 | 0.050 | <0.02 | <0.001 | 0.21 | <0.02 | <0.002 | (3) | do | Hard, brittle | 429 | 416 |
| 57 | 12 | 16 | 17 | 0.009 | <0.02 | <0.001 | 0.11 | <0.02 | <0.001 | (3) | do | do | 534 | 522 |
| 60 | 14 | 16 | 21 | 0.001 | <0.02 | <0.002 | 0.029 | <0.02 | <0.002 | (3) | do | do | 507 | 495 |
| 62 | 14 | { 30 / 30 / 65 | (4) / (5) / (6) | 0.006 / 0.003 / <0.001 | <0.02 / <0.02 / <0.02 | <0.001 / <0.001 / <0.001 | (See Table 7) | | | 35 | do | do | 560 | 519 |

[1] Solution Analyses: Control Analysis Section, Extraction Metallurgy Division.
[2] M. S. D.: Mineral Sciences Division (for Dr. A. H. Webster).
[3] Ambient.
[4] Decant 1.
[5] Decant 2.
[6] Final decant plus wash.

TABLE 5

Co-precipitation of the Hydrated Oxides of $Pb^{2+}$, $Zr^{4+}$ and $Ti^{4+}$ from Acidic Nitrate Solution: Operating Conditions for the Spray Technique

| | Batch | |
|---|---|---|
| Stoichiometry | D3 | D4 |
| | $Pb(Zr_{0.54}Ti_{0.46})O_3$ | $Pb(Zr_{0.53}Ti_{0.47})O_3$ |
| Oxides: Total Wt., lbs | 5.79 | 3.47 |
| Nitrate Solution: | | |
| Volume, l | 40.80 | 23.75 |
| Oxide Content, g./l | 65.13 | 66.63 |
| Flow Rate, ml./min | 240 | 225 |
| Precipitation Tank: | | |
| Vol. Demin. Water + $\left(\begin{array}{c}NH_4NO_3\\1/2\,g./l.\end{array}\right)$, l | 130 | 65 |
| Temperature, °C | 55 | 55 |
| pH | 8 | 7 |
| Precipitant: | | |
| $NH_3:N_2$ at 1:1, l./min | 28.0 | 14.8 |
| $(NH_4)_2 CO_3$ Soln. (8.6% w./v.), ml./min | Nil | [1] 45 |
| Tank O'flow: Siphon Rate, ml./min | 240 | 270 |
| Time for Batch Run, hrs | 2.83 | 1.75 |
| Precipitate Wash: | | |
| Demineralized Water | (2) | (3) |
| No. of decantations | 4 | 3 |
| Total Volume, Imp. Gal | 310 | 180 |
| Feed to Spray Dryer: | | |
| Percent Solids | 3.1 | 4.1 |
| $NO_3$ in supernatant liq., g./l | 0.26 | 0.31 |
| Precipitation Reagent Consumption, lb./lb. oxides: | | |
| $N_2$ | 1.14 | 0.62 |
| $NH_3$ | 0.69 | 0.38 |
| $(NH_4)_2 CO_3$ | | 0.26 |

[1] 1.25+Stoich. Req't.
[2] 0.05% $NH_3$.
[3] pH7.

Tables 3 and 4 also show the importance of pH control. In similar tests, 55, 57 and 60, the loss of lead to the barren solution decreased as the precipitation pH increased from 7 to 7.5 to 8.0 respectively. It has been found, that at pH 8, there are substantially no chemically detectable quantities of any of the three components discarded in the barren solution or in the wash water. Similarly, when the precipitate wash water pH was increased there was considerably less lead discarded in the wash solutions. Zirconium and titanium losses appear to be unaffected by the fore-mentioned pH variations.

Conditions under which the precipitates were dried are shown in Table 4. In tests 37–39, in which the filter cake was dried at 110° C. and in tests 5, 57, 60 and 62 where drying occurred at ambient temperature under vacuum (26–29″ water), the precipitate dried hard and brittle. Such precipitates required considerable mortaring in order to pass through a 100 mesh Tyler screen. However, when the relatively large quantity of water in the wet filter cake was completely displaced by methanol, the methanol displaced by ether, and the cake then dried under vacuum, it was found that the precipitate crumbled readily (tests 45, 46 and 47). The precipitate obtained from test 40, which contained slightly more than 52 percent basic lead carbonate, dried to a soft powder at 110° C. readily passing through a 100 mesh Tyler screen.

Table 5 shows the operating conditions for effecting the process of the present invention for the coprecipitation of hydrated oxides of $Pb^{+2}$, $Zr^{+4}$ and $Ti^{+4}$ from acidic nitrate solutions.

Table 6 records the analytically determined composition of the mixed hydroxide powders and indicates their proximity to the desired stoichiometry. Deviations from the desired relationships can be significantly reduced, possibly to less than 0.4 mole percent in regard to lead, with the Zr/Ti ratios being essentially exact. Attainment of this degree of control would necessitate extensive analyses and readjustments of the solutions which are composited into a precipitation feed solution.

As seen in Table 6, chemical analysis of the thoroughly washed precipitates showed a considerable amount of combined nitrate, particularly when the precipitate remained in the nitrate-rich barren solution for an extended period of time (>15 hr.; see Tables 3 and 6). The precipitate from tests 37, 39 and 40 was filtered and washed soon after completion of precipitation. The precipitate from test 38 stood over night as slurry. However, all four precipitates were dried at 110° C. Analyses for $NO_3$ gave the following results: 0.12 percent for precipitates 37 and 40, 0.53 for number 39 and 1.02 percent for number 38. This comparison shows that the chemically bound nitrate can be decreased by prompt separation of precipitate from the nitrate solution, followed by immediate washing out of soluble nitrate. The nitrate can also be decreased by heating the precipitate to 110° C. where some basic lead nitrate may decompose. In tests 45–47, 55, 57 and 60 the precipitates remained in contact with the nitrate solution for many hours before filtering. They were also dried under vacuum without heating. In tests based on 500 grams of dry precipitate, there was insufficient time to filter the slurry the same day. Therefore a partial decantation method was set up for test 62 (Table 7). The precipitate was allowed to settle, the solution was drawn off, the slurry was diluted with 0.5 percent w./w. $NH_4OH$ and allowed to agitate gently overnight. Due to this treatment a precipitate was obtained that, when dried, analyzed 2.48 percent $NO_3$. A small quantity of the slurry had been withdrawn at the completion of precipitation, filtered immediately and washed thoroughly. This was readily done because of the few grams of material involved. The analysis of the dry precipitate showed 0.74 percent $NO_3$.

TABLE 6.—RESULTS OF ANALYSIS

Mixed Precipitates of Pb, Zr and Ti Hydroxides

| Run number | Molar percent Zr:Ti | | Percentage Composition [1] | | | Major Contaminants [1] percent | | Molar Ratio | | Moles percent Pb Deviation from Stoichiometry |
|---|---|---|---|---|---|---|---|---|---|---|
| | Nominal | Analysis | Pb | $ZrO_2$ | Ti | $NO_3$ | $CO_2$ | $PbO:NO_3$ | $PbO:CO_3$ | |
| 37 | 52:48 | 52.2:47.8 | 61.3 | 18.9 | 6.70 | 0.12 | | 152 | | +0.8 |
| 38 | 52:48 | 52.6:47.4 | 60.3 | 18.5 | 6.48 | 1.02 | | 17 | | +2.1 |
| 39 | 50:50 | 51.0:49.0 | 59.5 | 17.7 | 6.62 | 0.53 | | 34 | | +1.8 |
| 40 | 50:50 | 50.3:49.7 | 57.6 | 16.5 | 6.34 | 0.12 | 8.58 | 143 | 1.43 | +4.5 |
| 45 | 50:50 | 50.8:49.2 | 56.6 | 17.2 | 6.46 | 5.04 | | 3.4 | | −0.5 |
| 46 | 52:48 | 52.5:47.5 | 57.0 | 17.5 | 6.16 | 5.25 | | 3.3 | | +1.9 |
| 47 | 54:46 | 54.4:45.6 | 56.3 | 17.8 | 5.80 | 4.76 | | 3.5 | | +2.4 |
| 55 | 58:42 | 57.6:42.4 | 55.5 | 18.4 | 5.27 | 6.75 | | 2.5 | | +3.3 |
| 57 | 54:46 | 55.6:44.4 | 55.5 | 18.5 | 5.75 | 6.00 | | 2.8 | | −0.1 |
| 60 | 54:46 | 53.8:46.2 | 55.1 | 18.0 | 6.01 | 5.30 | | 3.1 | | −2.1 |
| 62 | 54:46 | 53.4:46.6 | 56.9 | 18.1 | 6.13 | 2.48 | | 6.9 | | 0 |

[1] By Control Analysis Section, Extraction Metallurgy Division.

Table 6 shows the analyses of the feed solution of test 62. The results show that stoichiometry can be very closely controlled in this precipitation procedure. Since test number 62 represented a preferred embodiment and since it presents a cross-checking of metal ratios, a complete tabling of all the results of this run is available in Table 6. The precipitate appears to be satisfactory.

TABLE 7.—OPTIMUM OPERATING CONDITIONS AND RESULTS (TEST NO. 62)

Basis: 500 g. pure, dry oxides of $Pb^{2+}$, $Zr^{4+}$ and $Ti^{4+}$ to yield the ratio $PbZrO_3:PbTiO_3=54:46$ (Moles percent)

| | Quantity | Analytical Results | | | | Moles Percent Zr:Ti | Pb Deviation from Stoich., Percent | Percent Volatile from— | |
|---|---|---|---|---|---|---|---|---|---|
| | | Pb | $ZrO_2$ | Ti | $NO_3$ | | | Analyses | Ppt. Wts. |
| Feed Soln. (sprayed) | 141 | 22.7 g./l. | 7.32 g./l. | 2.42 g./l. | 50.5 g./l. | 54.1:45.9 | −0.003 | | |
| Precipitation vessel | 101 | Of pH 8 ammonia water, at 55° C. and thoroughly agitated. Controlled pH at 8 for 6 hr. run with $N_2+NH_3$ (1:1) at rate 2L/min. | | | | | | | |
| | | (a) 1 litre filtered immediately and washed with ammonia water (Ppt. 1) (Obtained Barren 1 and Wash 1). | | | | | | | |
| | | (b) 23 litres: | | | | | | | |
| Final Ppt. Slurry | 241 | (1) Diluted to 50 l with 0.5% $NH_4OH$. Agitated slowly overnight. | | | | | | | |
| | | (2) Settled and decanted (Decant 1). | | | | | | | |
| | | (3) Repulped (0.5% $NH_4OH$), settled and decanted (Decant 2). | | | | | | | |
| | | (4) Repulped (0.5% $NH_4OH$), filtered and washed with 20 l. 0.5% $NH_4OH$, i.e. till wash was free of $NO_3$—(Decant, Wash 3) (Ppt. 2). | | | | | | | |
| Barren 1 | 1 l | 0.006 g./l. | <0.02 g./l. | <0.001 g./l. | | | | | |
| Wash 1 | 3″ | <0.001 g./l. | <0.02 g./l. | <0.001 g./l. | | | | | |
| Decant 1 | 30″ | 0.006 g./l. | <0.02 g./l. | <0.001 g./l. | | | | | |
| Decant 2 | 30″ | 0.003 g./l. | <0.02 g./l. | <0.001 g./l. | | | | | |
| Decant, Wash 3 | 65″ | <0.001 g./l. | <0.02 g./l. | <0.001 g./l. | | | | | |
| Precipitate 1 | 24 g. | | <0.02 g./l. | <0.001 g./l. | 0.74% | | | | |
| Precipitate 2 (Vac. Dried) 35° C | 536″ | 56.9% | 18.1% | 6.13% | 2.48% | 53.4:46.6 | −0.001 | 10.4 | 10.7 |

TABLE 8.—REPRODUCIBILITY OF DRY PRECIPITATE STOICHIOMETRY CO-PRECIPITATION PROCESS

| Lot No. | Oxide Recovery (lb.) | | Analyses (g./l.) Feed Solution | | | Stoichiometry | | | |
|---|---|---|---|---|---|---|---|---|---|
| | | | | | | Feed Solution | | Dried Precipitate | |
| | | | PbO | $ZrO_2$ | $TiO_2$ | $ZrO_2/ZrO_2+TiO_2$ | $PbO/ZrO_2+TiO_2$ | $ZrO_2/ZrO_2+TiO_2$ | $PbO/ZrO_2+TiO_2$ |
| 57 | 1.03 | Filter, wash, Vac. dry | 26.82 | 8.25 | 4.24 | 0.558 | 1.001 | 0.556 | 0.999 |
| 62 | 1.10 | Decant. wash, Filter, Vac. dry | 24.45 | 7.32 | 4.04 | 0.541 | 1.000 | 0.534 | 1.000 |
| R1 | 1.09 | Decant. wash, Spray dry | 10.72 | 3.07 | 1.83 | 0.520 | 1.003 | 0.524 | 1.005 |
| R2 | 1.02 | do | 10.77 | 3.09 | 1.85 | 0.520 | 1.000 | 0.525 | 1.014 |
| R3 | 1.10 | do | 10.75 | 3.10 | 1.83 | 0.523 | 1.001 | 0.526 | 1.011 |
| R4 | 2.18 | do | 11.87 | 3.42 | 1.98 | 0.524 | 1.003 | 0.526 | 1.003 |
| R5 | 2.20 | do | 18.18 | 5.17 | 3.09 | 0.521 | 1.005 | 0.526 | 0.999 |
| R6 | 2.20 | do | 10.74 | 3.06 | 1.83 | 0.520 | 1.005 | 0.524 | 0.998 |
| R7 | 2.22 | do | 13.52 | 3.85 | 2.32 | 0.520 | 1.001 | 0.525 | 1.004 |
| Mean±Std. Dev | | | | | | 0.521±.002 | 1.002±0.002 | 0.525±0.001 | 1.004±0.006 |

TABLE 9

Co-precipitated Hydrated Oxides: Stoichiometry $Pb(Zr_{0.5}Ti_{0.5})O_3$ to $Pb(Zr_{0.7}Ti_{0.3})O_3$ Feed Soln: 21 to 24 g. oxides/litre
Lot Size: 1¼ lb. oxides
Washing: Decantation
Drying: Vacuum (Filter Cake)

| | $ZrO_2/ZrO_2+TiO_2$ | | | $PbO/ZrO_2+TiO_2$ | | |
|---|---|---|---|---|---|---|
| Lot No. | Nitrate Feed Soln. | Precipitate | Difference, mole percent | Nitrate Feed soln. | Precipitate | Difference, mole percent |
| MR1 | 0.502 | 0.499 | −0.3 | 0.989 | 0.997 | +0.8 |
| MR2 | 0.507 | 0.511 | +0.4 | 0.961 | 0.957 | −0.4 |
| MR3 | 0.527 | 0.523 | −0.4 | 0.953 | 0.955 | +0.2 |
| MR4 | 0.554 | 0.553 | −0.1 | 0.979 | 0.985 | +0.6 |
| MR5 | 0.596 | 0.592 | −0.4 | 0.971 | 0.977 | +0.6 |
| MR6 | 0.640 | 0.643 | +0.3 | 0.989 | 0.987 | −0.2 |
| MR7 | 0.690 | 0.693 | +0.3 | 0.990 | 0.989 | −0.1 |
| Average | | | | 0.976 | 0.978 | |
| Std. Dev | | | | ±0.015 | ±0.016 | |

Tables 8 and 9 show the extent to which reproducibility has been achieved according to the present invention. Table 7 indicatees the potential for the reproducibility of a particular stoichiometry. Lots R1 to R7 were similarly produced except in lot size and feed solution concentrations which were varied. Table 8 shows the chemical results of a series of runs which embraced an interesting range of stoichiometry. This again indicates good reproducibility of the solution stoichiometry into the final product, for individual lots.

The possibilities that exist for the presence of basic lead nitrates in neutralized nitrate solutions is believed due to the fact that a rather complex equilibrium is established in the slurry and that no single formula for basic lead nitrate can be expected. The percentage of basic lead nitrate in the dry cake would depend on conditions within the precipitation slurry, the method of precipitate washing, and the temperature at which the precipitate is dried.

TABLE 10.—SEMI-QUANTITATIVE SPECTROGRAPHIC ANALYSES

Impurities in precipitated hydroxide mixtures (dried and powdered)

| Test No. | Source chemicals (See Table 1) | Elements, percent | | | | | | | |
|---|---|---|---|---|---|---|---|---|---|
| | | Si | Mg | Ca | Al | Fe | Bi | Cu | Mn |
| 38 | $PbO:ZrO_2:TiO_2$ | 0.03 | 0.04 | ND | 0.02 | Tr | Tr | 0.004 | ND |
| 39 | Same as 38 | 0.03 | 0.001 | Tr | 0.03 | Tr | Tr | 0.003 | Tr |
| 40 | do | 0.03 | 0.01 | 0.02 | 0.03 | Tr | Tr | 0.002 | Tr |
| 47 | do | 0.04 | 0.03 | Tr | 0.07 | 0.03 | Tr | Tr | Tr |
| 55 | $ZrOCl_2 \cdot 8H_2O$, $Ti(SO_4)_2 \cdot 9H_2O$, $PbCO_3$. | 0.03 | Tr | ND | 0.03 | 0.1 | ND | 0.004 | Tr |
| 57 | Same as 55 except Ti from Liq. $Ti(Cl)_4$. | 0.03 | Tr | Tr | Tr | Tr | ND | 0.003 | ND |
| 60 | Same as 55 | 0.05 | Tr | ND | 0.01 | Tr | 0.02 | 0.003 | Tr |
| 62 | do | 0.03 | Tr | ND | 0.009 | Tr | 0.02 | 0.005 | Tr |

NOTE.—Tr=Trace; ND=Not detected.

Table 10 gives the semiquantitative spectrographic analyses of the precipitates obtained from two groups of source chemicals (refer to Table 1). The precipitates obtained using high purity oxides as source material (test 38–40, 47) are approximately 99.9 percent pure. The precipitates derived from the metal salt sources (tests 55, 57, 60, 62) appear to have a greater purity ($\approx$99.95 percent) but still contain an average 0.03 percent silica.

Table 11 shows the results of calculations, based on analyses of precipitates, which are an attempt to arrive at the possible composition of the various dry powders. It was unlikely that all the basic lead nitrates would decompose below 110° C., for the results of tests 38 and 47, involving about equal weights of precipitate which had been standing in nitrate-rich solution for greater than 15 hours, show 12.7 percent basic lead nitrate after drying at 110° C. (test 38) and 59.1 percent basic lead nitrate after drying at ambient temperature (test 47).

TABLE 11.—CALCULATED PERCENT COMPOSITION OF DRY, MIXED-HYDROXIDE PRECIPITATES SUBMITTED AS A FEED MATERIAL FOR CALCINING AND SINTERING TESTS BASED ON ANALYTICAL RESULTS

|  | Test No. | | | | | | | | | | |
|---|---|---|---|---|---|---|---|---|---|---|---|
|  | 37 | 38 | 39 | 40 | 45 | 46 | 47 | 55 | 57 | 60 | 62 |
| Drying Temp | 110° C. | | | | Ambient-Vacuum Dry | | | | | | 35° C. |
| $TiO_2$ | 11.2 | 10.8 | 11.0 | 10.6 | | | | | | | |
| $ZrO_2$ | 18.9 | 18.5 | 17.7 | 16.5 | | | | | | | |
| $TiO_2.\frac{1}{2}H_2O$ | | | | | 12.0 | 11.4 | 10.8 | 9.8 | 10.7 | 11.2 | 11.4 |
| $ZrO_2.\frac{1}{2}H_2O$ | | | | | 18.5 | 18.8 | 19.1 | 19.8 | 19.9 | 19.3 | 19.5 |
| $3Pb(OH)_2.Pb(NO_3)_2$ | | | | | | | | | 30.9 | 11.9 | |
| $5Pb(OH)_2.Pb(NO_3)_2$ | 1.5 | 12.7 | 6.6 | 1.5 | 62.5 | 65.1 | 59.1 | 38.6 | 57.0 | 65.8 | 30.8 |
| $Pb(OH)_2$ | 70.0 | 57.3 | 63.2 | 18.6 | 7.0 | 5.1 | 10.0 | None | None | 2.3 | 37.3 |
| $5PbCO_3.2Pb(OH)_2$ | | | | 52.1 | | | | | | | |
| Total | 101.6 | 99.3 | 98.5 | 99.3 | 100.0 | 100.4 | 99.0 | 99.1 | 99.5 | 98.6 | 99.0 |

Table 12 shows the adjusted dry precipitate composition.

TABLE 12.—DRY PRECIPITATE COMPOSITION-ADJUSTED

|  | Test No. 39 | Test No. 69 |
|---|---|---|
| $TiO_2.1/4H_2O$ | 11.6 |  |
| $TiO_2.3/4H_2O$ |  | 11.8 |
| $ZrO_2.1/2H_2O$ | 19.0 |  |
| $ZrO_2.H_2O$ |  | 20.3 |
|  | 30.6 | 32.1 |
| Basic Lead Nitrates (Table 11) | 69.8 | 68.1 |
| Total | 100.4 | 100.2 |

The $ZrO_2$ and $TiO_2$ hydrates which exist in the precipitate probably have a water content that varies continuously with temperature. There appears to be approximately one half molecule of water of hydration for each oxide. Tests 39 and 60 (Table 11) show total percentage composition deviating farthest from 100 percent. If the water of hydration is increased fractionally from the formula amounts given in Table 11, then total composition percentages are acceptably close to one hundred (Table 12). Relatively small variations in drying conditions (temperature of time) could cause this formula variation.

Table 13 shows the total reagent consumption, and reagent cost, for the production of one pound of material, namely $Pb(Zr_{0.54}Ti_0.46)O_3$ made according to the process of the present invention.

provided spray drying of the aqueous mixed precipitate slurry, thoroughly washed by decantation. The spray drying method produced spherical particles of quite uniform size. Spray drying is also believed to enable partial calcination to take place within a very small particle (3–10µ dia.) and thus premature grain growth would be limited. Furthermore, a spray dried material should eliminate the possibility of precipitate segregation which could occur during conventional pan filter operation. Finally, the risk of contamination of the product is lessened and losses due to dusting can be reduced to a minimum. In particular it has been found that spray drying yields a uniform, free-flowing material that is amenable as a feed powder to the pneumatic "jet" mill.

Some advantages then of the chemical precipitation process of the present invention as a source of feed powders for electronic ceramic fabrication would appear to be, principally:

(a) Maximum possible control over the stoichiometry and reproducible homogeneity of the powder.
(b) The opportunity to control the purity of the material, if required, by additional purification procedures.
(c) The method should allow uniform blending of very small quantities ($\ll 1$ percent) of desirable doping agents for modification of the electrical properties of the final ceramic component. The doping agents are metals (very pure salts or oxides will be required)

TABLE 13.—REAGENT CONSUMPTION IN THE PRODUCTION OF DRY CO-PRECIPITATED OXIDE HYDRATES

Basis: 1 lb. $Pb(Zr_{0.54}Ti_{0.46})O_3$

|  | Pounds of Reagent | | | | | | | | | |
|---|---|---|---|---|---|---|---|---|---|---|
|  | Preparation of Nitrate Solutions | | | | | | | | | |
| Reagent | PbO | $ZrO_2$ | $TiO_2$ | Subtotal | Water treatment (Demineralization) | Precipitation | Ppt. Wash and Spray Dry | Total Reagent Consump. | Cost per lb. reagent, $ | Reagent Cost, $ |
| Final Product | 0.684 | 0.204 | 0.113 | 1.00 | | | | | | |
| PbO | 0.684 | | | 0.684 | | | | 0.684 | 0.65 | 0.445 |
| $ZrOCl_2.8 H_2O$ | | 0.534 | | 0.534 | | | | 0.534 | 0.75 | 0.401 |
| $TiCl_4$ | | | 0.268 | 0.268 | | | | 0.268 | 1.56 | 0.418 |
| HCL | | | 0.027 | 0.027 | 0.704 | | | 0.731 | 0.175 | 0.128 |
| $HNO_3$ | 0.677 | 0.410 | 0.677 | 1.764 | | | | 1.764 | 0.380 | 0.670 |
| $NH_3$ | | 0.082 | 0.174 | 0.256 | | 0.690 | 0.066 | 1.012 | 0.215 | 0.218 |
| $N_2$ | | | | | | 1.140 | | 1,140 | 0.344 | 0.392 |
| $NH_4NO_3$ | | | 0.535 | 0.535 | | | | 0.535 | 0.350 | 0.187 |
| Caustic (flake) | | | | | | 0.323 | | 0.323 | 0.05 | 0.002 |
| Liq. Propane | | | | | | | 2.7 | 2.7 | 0.038 | 0.103 |
| Water (Imp. Gal.) | 0.5 | 19 | 18 | 37.5 | | | 53.5 | 91 | 0.034/100 | 0.031 |
| Total | | | | | | | | | | $3.00 |

The feed material for ceramic fabrication should have a uniform particle size in the range 0.5 to 1 micron. This size range is required in order to achieve high sintered densities in the fabricated components. Precipitation techniques do not appear to yield such fine particles, principally because of agglomeration or flocculation of particles in the precipitate slurry and the densification which takes place when the filter cake is dried. Accordingly, by another embodiment of the present invention, there is which possibly will require application of coprecipitation techniques for satisfactory blending.

Thus, in summary, the process of the present invention provides the quantitative precipitation of the metals contained in each minute droplet of feed solution with such rapidity that there is virtually no opportunity for selective precipitation to occur. The precipitate particle therefore consists of an intimate chemical mixture of metal carbonates and/or oxide hydrates. This is more desirable than a physical blend of individual metal precipitates because the metal components of the coprecipitation slurry do not segregate during subsequent operation such as washing, settling, centrifuging, and spray drying. Therefore stoichiometry and homogeneity of the material are maintained. Reproducibility is under a high order of control as the process is amenable to continuous operation with control analysis performed on feed solutions, dry precipitates and calcined ceramic. Furthermore, the intimacy of the mix and its unusually reactive form enable the calcining operation to be done at a lower temperature than that required for the present commercial process. This feature makes it possible to obtain a much finer particle size with a minimum of contamination during the grinding operation. The net result is that complete reaction and solid solution formation occur with substantially less sintering than required for finely ground mixture of oxides.

Using the same technique and equipment as in the previous examples, tests have been carried out with the following ferrites: $BaO \cdot 6Fe_2O_3$; $PbO \cdot 6Fe_2O_3$; and $SrO \cdot 6Fe_2O_3$. In some tests, the amount of $Fe_2O_3$ was changed from 6 to 5.9 and 5.8. A total of 16 one-pound lots were prepared and very satisfactory results were obtained.

In preparing the aforesaid ferrites, the precipitation bath was sparged with both ammonia and carbon dioxide.

We claim:
1. In a process for the preparation of mixed metal oxides selected from the group consisting of (a) lead zirconate titanates and (b) ferrites of barium, lead and strontium, the metals of said oxides being in a particular selected ratio to each other, the improvement which comprises continuously atomizing a selected blended acidic aqueous solution of said metals onto the surface of a relatively large volume of a dilute ammoniacal solution, thereby simultaneously coprecipitating precursors of said mixed metal oxides from said acidic solution the amount of said metals in said solution being balanced to provide such selected ratio in the mixed metal oxides thereby forming an intimate substantially homogeneous mixture of the precursors of such mixed metal oxide in the same selected ratio as in said mixed metal oxide and thereafter converting said precursor mixture to said mixed metal oxide.

2. In a process for the preparation of a lead zirconate titanate ceramic wherein the metals thereof are in a particular selected ratio to each other the improvement which comprises continuously atomizing a selected blended acidic aqueous solution of said metals onto the surface of a relatively large volume of a dilute ammoniacal solution, thereby simultaneously coprecipitating precursors of said metal oxides from said acidic solution, the amount of said metals in said solution being balanced to provide such selected ratio in the mixed metal oxides thereby forming an intimate substantially homogeneous mixture of the precursors of such mixed metal oxides in the same selected ratio as in said mixed metal oxides and thereafter converting said precursor mixture to said mixed metal oxides.

3. The process of claim 2 wherein the acidity of the solution of said metals is decreased by a two-step process comprising
(i) adding ammonium hydroxide thereto until the pH is 0.6, and
(ii) adjusting the pH to a value of about 1.6 just below incipient precipitation by adding a reagent comprising ammonium hydroxide and carbon dioxide.

4. The process of claim 2 wherein the temperature during said simultaneous precipitation step is maintained within the range of 50–60° C.

5. The process of claim 2 wherein the pH of the solution is maintained at from about 7 to about 8.

6. The process of claim 5 wherein the pH is maintained at from about 7 to about 8 by the continuous sparging into said volume of solution of an ammonia-gas mixture.

7. The process of claim 2 wherein the precipitation is carried out under conditions of agitation of the bulk solution.

8. The process of claim 2 including the step of
(1) washing said precipitates
(2) thickening said slurry of washed precipitates
(3) drying said slurry to produce a dry homogeneous powder of said mixed metal precipitates, and
(4) calcining said powder to form said oxides, said calcining being at a temperature sufficient to achieve the desired degree of reaction and solid solution.

9. The process of claim 8 wherein step (3) comprises: producing a dry homogeneous powder of oxide precursors whcih are non-segregating by spray drying said thickened precipitated slurry.

10. The process of claim 8 including the step of (5) comminuting the calcined material to a particle size required for subsequent fabrication to a ceramic component and forming said ceramic component therefrom.

11. The process of claim 2 wherein said dilute ammoniacal solution is maintained in the range 7.5 to 8.5 by continuously adding a gaseous mixture of $NH_3$ and $N_2$ below the surface of said liquid.

12. The process of claim 2 wherein said dilute ammoniacal solution is maintained in the range 7 to 7.5 by continuously adding one gaseous mixture comprising $NH_3$ and $N_2$ and a second gaseous mixture comprising $CO_2$ and $N_2$ below the surface of said liquid.

13. A process as claimed in claim 2 in which the acidic aqueous solution contains nitrates of said metals.

14. A process as claimed in claim 13 in which the aqueous solution of the metals is prepared by dissolving oxides or salts of said metals in an acid to form an acidic solution thereof, clarifying said solution, precipitating the metal from said solution with ammonia, washing the precipitate free from soluble salts, dissolving the precipitate in nitric acid clarifying the solution, analyzing the precise metal contents of the solution and blending nitrate solutions of the metals so prepared to provide a balance of said metals for said preselected ratio.

15. The process of claim 13 wherein said nitrate solution also contains predetermined amounts of modifiers selected from the group consisting of Sr, Fe, Co, Cr, Nb, Ta and Ce.

References Cited

UNITED STATES PATENTS

| | | | |
|---|---|---|---|
| 2,737,444 | 3/1956 | Fisher et al. | 23—143 |
| 2,906,710 | 9/1959 | Kulcsar et al. | 252—62.9 |
| 3,136,605 | 6/1964 | Legge et al. | 23—200 |

FOREIGN PATENTS

| | | |
|---|---|---|
| 717,269 | 10/1954 | Great Britain. |
| 790,093 | 2/1958 | Great Britain. |
| 869,554 | 5/1961 | Great Britain. |
| 664,086 | 1/1952 | Great Britain. |

TOBIAS E. LEVOW, Primary Examiner

R. D. EDMONDS, Assistant Examiner

U.S. Cl. X.R.

106—39; 252—62.9